(12) United States Patent
Vuylsteke

(10) Patent No.: US 6,356,652 B1
(45) Date of Patent: Mar. 12, 2002

(54) VISUALIZATION OF DIAGNOSTICALLY IRRELEVANT ZONES IN A RADIOGRAPHIC IMAGE

(75) Inventor: Pieter Vuylsteke, Mortsel (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 08/335,917

(22) Filed: Nov. 8, 1994

(30) Foreign Application Priority Data

Nov. 23, 1993 (EP) .............................................. 93203277

(51) Int. Cl.[7] .................................................. G06K 9/36
(52) U.S. Cl. ........................................ 382/132; 382/274
(58) Field of Search ................................. 382/254, 274, 382/299, 128, 132; 378/58, 54, 62; 128/922

(56) References Cited

U.S. PATENT DOCUMENTS

| | | | | | |
|---|---|---|---|---|---|
| 4,542,459 | A | * | 9/1985 | Riederer | 364/414 |
| 4,803,639 | A | * | 2/1989 | Steele et al. | 378/58 |
| 5,467,404 | A | * | 11/1995 | Vuylsteke et al. | 382/274 |

* cited by examiner

*Primary Examiner*—Andrew W. Johns
(74) *Attorney, Agent, or Firm*—Hoffman, Warnick & D'Alessandro LLC; John A. Merecki

(57) ABSTRACT

A method for processing a radiographic image in a digital radiographic system. The image is processed to attenuate light transmitted by a diagnostically irrelevant area when a hard copy is viewed on a console screen or when the image is displayed. Information within the diagnostically irrelevant area is retained notwithstanding the processing attenuation.

16 Claims, 8 Drawing Sheets

POWER FUNCTION p=0.7

VISUALIZATION OF DIAGNOSTICALLY IRRELEVANT ZONES IN A RADIOGRAPHIC IMAGE

FIELD OF THE INVENTION

The present invention is in the field of digital radiography. The invention more specifically relates to an image processing method applied for the purpose of enhancing the quality of diagnostic evaluation of a radiographic image.

BACKGROUND OF THE INVENTION

In the field of digital radiography, a wide variety of image acquisition techniques have been developed such as computerised tomography, nuclear magnetic resonance, ultrasound, detection of a radiation image by means of a CCD sensor or a video camera, radiographic film scanning etc. By means of these techniques, a digital representation of a radiographic image is obtained.

In still another technique, a radiation image, for example an image of x-rays transmitted by an object, is stored in a screen comprising a photostimulable phosphor such as one of the phosphors described in European patent publication 503 702 published on Sep. 16, 1992 and U.S. Ser. No. 07/842,603. The technique for reading out the stored radiation image consists of scanning the screen with stimulating radiation, such as laser light of the appropriate wavelength, detecting the light emitted upon stimulation and converting the emitted light into an electric representation, for example, by means of a photomultiplier and finally digitizing the signal.

The digital images obtained by one of the acquisition techniques described hereinbefore can be subjected to a wide variety of image processing techniques.

If the unprocessed original image representation. is stored, it can be subjected off-line to different types of image processing techniques as well as to processing using different values of the processing parameters as frequently as required.

The processed or unprocessed images can further be applied to a display device and/or can be reproduced by means of an image recorder such as a laser recorder or the like.

For the purpose of display and/or hard copy recording signal, values are converted into density values envisioned in the display or hard copy according to a signal-to-density mapping curve that has a predetermined shape in between a minimum and a maximum displayable or reproducible density value.

In some applications radiologists protect their subjects against unnecessary exposure to X-rays by use of X-ray opaque 'collimation' material. The material is placed in the path of the X-ray beam so as to shield those areas of the patient which are not regarded as diagnostically important. Besides reducing patient dosage this technique has the additional advantage of limiting the amount of scattered radiation in the image field of interest. The regions of the resulting image which comprise the shadow cast by the X-ray opaque material (shadow regions) are exposed only by scattered radiation.

The presence of the collimation shadow region however can cause a problem in the display of the radiographic image on film or on a display device. Therein, the shadow region is relatively bright, and if displayed unmodified, may impair diagnosis of subtle lesions due to dazzle, especially if the unexposed region is relatively large.

It has been proposed in European patent application 523 771 to establish the region of interest and then to convert signal values of the radiographic image into density values to be displayed either as soft copy on a display device or as hard copy on film in such a way that pixels outside the diagnostically relevant zone are visualized so that the light transmitted by said image part when the hard copy is viewed on a console screen or when it is displayed, is effectively masked off.

In accordance with one embodiment described in this patent, the electrical signals of the pixels comprised within the diagnostically not relevant image zone within the radiographic image are converted to a uniform density values comprised between 0.5 and 2.5.

By applying this method, the dazzling effect produced by the light transmitted by the irrelevant region is decreased. However, as a consequence of the application of this method also the image information that was present in the diagnostically irrelevant area is lost.

OBJECTS OF THE PRESENT INVENTION

It is an object of the present invention to provide a method of processing the radiographic image in a digital radiographic system in such a way that the dazzling effect described above does not occur and that the quality of diagnostic evaluation of a radiographic image is enhanced.

It is a further object of the invention to provide such a method wherein the information in a collimation region is not entirely lost.

It is still a further object to provide such a method for application in a system wherein a radiographic image is stored in a photostimulable phosphor screen and wherein said screen is scanned with stimulating irradiation, the light emitted upon irradiation is detected and converted into a digital signal representation.

Still further objects will become apparent from the description given hereafter.

STATEMENT OF THE INVENTION

The objects of the present invention are achieved by a method of processing an image in a radiographic imaging system wherein an electric signal representation of said image is mapped to density values for visualization as a hard or a soft copy image characterized in that the density of low density area in a diagnostically irrelevant zone in the image is enhanced and image structure in said zone is kept visible, by converting in said diagnostically irrelevant zone of the image pixels located at position (x,y) according to a conversion function $g(x,y)=a.f(x,y)+(1-a).f_{max}$ wherein $f(x,y)$ is the signal value before conversion of a pixel located at position (x,y), a is a value between zero and one, and $f_{max}$ is equal to the maximum of values $f(x,y)$, prior to being subjected to mapping into density values.

By applying the method according to this invention the pixel values of the radiographic image are converted in such a way that (i) the pixels outside the diagnostically relevant zone are visualized or reproduced so that the light transmitted by said irrelevant image zone when the hard copy is viewed on a console screen or when the image is displayed, is attenuated, and (ii) whereas the information within the diagnostically irrelevant zone is not lost.

This was obtained by processing pixels of the radiographic image differently when they were situated in the region of interest than when they were situated in the diagnostically irrelevant zone.

Pixels belonging to the irrelevant image zone where subjected to a conversion, for example being implemented in the form of a look up table, applied before signal-to-density mapping.

Pixels within the relevant image zone are converted by means of an identity transformation (i.e. they are not additionally converted) whereas pixels outside the diagnostically relevant zone are converted in accordance with a conversion function that can be represented by a straight line located above the identity transformation and that has a slope in between 0 and 1 so that pixels in the diagnostically irrelevant zone are converted to a higher average density than that of the remainder of the image and so that image information in that part of the image is not lost.

This conversion can generally be represented as: $g(x,y)=af(x,y)+(1-a)f_{max}$, wherein $g(x,y)$ is a pixel value after transformation, $f(x,y)$ is the pixel value before conversion and 'a' is the slope of the conversion function applied to pixels outside the region of interest, $f_{max}$ is the maximum of values $f(x,y)$. The slope 'a' has a value between zero and one and determines the minimum density to which pixel values in the diagnostically irrelevant zone can be converted.

In a preferred embodiment, the image is decomposed into a multi-resolution representation. That multiresolution representation is then modified for the purpose of enhancing the image quality, and the modified multi-resolution representation is finally subjected to a reconstruction process.

The additional signal conversion $g(x,y)$ of pixels within the diagnostically irrelevant zone is applied to a partially reconstructed image, i.e. to an image obtained by applying the reconstruction process to modified detail images only up to a predetermined resolution level, i.e. detail images at coarse resolution levels.

The converted partially reconstructed image is then subjected to the remainder of the reconstruction process.

The predetermined resolution level is such that (1) the computation time is limited and (2) the dynamic range of the image in the diagnostically irrelevant zone approximates that of the original image so that important image structure is retained. Typically an image of 100.000 to 1.000.000 pixels is required for this purpose.

Finally signal values of the complete reconstructed image are mapped onto corresponding density values and are reproduced or displayed.

This embodiment is preferred since it provides that diagnostically irrelevant zones in the image are reproduced or displayed in a way so that they do not produce a dazzling effect but that important image structures in these zones remain visible.

Mapping of signal values onto density values has been described extensively in European patent application EU-A-546 600, the contents of which is incorporated herein by reference.

A hard copy image can be recorded for example by means of a laser printer onto a photographic material.

Signal values within a diagnostically relevant image zone are preferably mapped onto density values that are situated in between a minimum density value equal to the fog value of the photographic material and a maximum value situated in a density range from 1.5 to 3.

Often a reproduction also comprises a window wherein patient identification data and occasionally other data are recorded. Signal values pertaining to pixels within such a window are preferably mapped onto density values within 0.5 and 1.5.

Signal values representing pixels that are located outside the image are mapped onto the maximum of density values attainable on the hard or soft copy.

The method of the present invention can be applied when reproducing or displaying images acquired by a great number of acquisition devices as described in the introductory part of this application. It was however, specifically designed for application in a system in which a stimulable phosphor is scanned with stimulating rays, light emitted upon stimulation is detected and converted into an electric signal representation of the image.

Since the method of the present invention is based on different processing of pixels depending on whether or not they are part of a diagnostically irrelevant image zone, this diagnostically relevant or irrelevant zone is first to be determined.

A diagnostically irrelevant zone is defined as encompassing all image points within the image that are not comprised within a diagnostically relevant image zone, that can for example be defined under visual control on a monitor or that can be determined automatically as will be described hereafter.

Several methods have been developed for recognizing a diagnostically relevant (or irrelevant) region. In European patent application 523 771, a number of methods have been described for manually delineating the diagnostically relevant zone in a radiographic image.

Delineation a diagnostically relevant image zone can for example be performed by the radiologist e.g. on the image displayed on a monitor. Although a man-controlled way of operation is described hereinafter, it is clear that the functions set forth hereinafter may be readily automated.

Delineation of a diagnostically relevant image part(s) within the overall radiographic image may be determined according to any of the following methods.

In all four methods described hereinafter, the radiographic image is first visualized on the screen of the preview monitor, a moveable light mark is generated on the screen of said monitor, and the motion of said light mark is synchronized with the motion of a marking means of a coordinate identification device such as a coordinate pen.

Now, according to a first embodiment, the diagnostically relevant image zone is defined as comprising all image points, the coordinates whereof are comprised within a contour drawn by moving said light mark under visual control on the screen of the monitor.

According to a second embodiment, an image point is marked as the upper left corner point and another image point is marked as the lower right corner point of the diagnostically relevant image zone. The coordinates of both said image points are determined and a rectangle on the basis of said coordinates is defined. Thereupon the diagnostically relevant image zone is defined as comprising all image points the coordinates whereof are comprised within said rectangle.

According to a third alternative embodiment, one image point is marked as the center point and another image point is marked as the outer point of the diagnostically relevant image zone; after determining the coordinates of both said image points, the diagnostically relevant image zone is defined as comprising all image points the coordinates whereof are comprised within a circle, the center point whereof coincides with the image point marked as the center point of the diagnostically relevant image zone, and the radius whereof is defined by the vector distance between said center point and the other image point marked as the outer point of the diagnostically relevant image zone.

According to a fourth embodiment, various image points are marked as the corner points of the diagnostically relevant image zone, said zone being defined as comprising all image points the coordinates whereof are comprised within a polygon the corner points whereof coincide with the image points marked as corner points of the diagnostically relevant image zone.

Whereas the first and fourth methods described have the advantage that the radiologist may define very accurately the diagnostically relevant image part, and the second and third methods offer the advantage of ease of operation. It suffices to mark only two image points for defining the diagnostically relevant image part. Whereas the third method is suitable for being used when radiographic images of e.g. the skull have been taken, the second method can advantageously be used for radiographs e.g. of the chest.

The above methods of defining the diagnostically relevant parts in a radiographic image can be used either alone or in combination with each other, in case a radiographic image would comprise e.g. more than one diagnostically relevant zone.

The method applied in a preferred embodiment is a method for automatically determining the region of interest. This method has been described in extenso in the published European patent application 610 605 (published Aug. 17, 1994). The contents of this application is hereby incorporated by reference.

In according with the method disclosed in EP 610 605 the location of a signal/shadow boundary in an X-ray image represented in a digital signal representation is first determined.

Then a different binary value is allocated to pixels within the determined signal shadow boundary than to pixels outside said signal shadow boundary.

The signal/shadow boundary is obtained by performing the following method steps:
i) Extracting low-level primitives from the image $\{X(i,j)\}$, more specifically said low level primitives are lines,
ii) Forming a reduced number of intermediate-level primitives from the low-level primitives, said intermediate level primitives are line-clusters,
iii) Building hypotheses as to the location of the signal-shadow boundary from combinations of intermediate-level primitives, during which each combination is subjected to intermediate-level tests,
iv) rejecting or accepting partial or complete hypotheses upon the result of said tests,
iv) Performing high-level verification tests on each hypothesis, whereupon hypotheses are rejected, or accepted at some cost, and
v) Selecting the hypothesis with the least cost.

As a result of this method, the information as to whether or not a pixel was part of the region of interest is given in the form of an overlay image. This overlay image is a low resolution binary image comprising labels which identify a pixel as belonging to the region of interest or not.

Blocking artifacts which were caused by the particular nature of the overlay image obtained by application of the method disclosed in European patent application 610 605, namely by the fact that the overlay image is a low resolution binary image, are avoided by transforming the binary overlay into a multiple valued overlay image through application of low pass filtering.

A gradual transition of the applied mapping transformations was provided for pixels outside the region of interest. The slope and the intersect of the applied mapping transformation was controlled by the pixel value in the overlay image, being multiple valued instead of binary.

The applied mapping transformation has a maximal slope in the collimation material shadow region and is equal to the identity mapping in the diagnostically relevant image region. This is described in further detail hereafter.

This transformation can mathematically be expressed as follows:

$$g(x,y)=[1+C(x,y)(a-1)]f(x,y)+C(x,y)(1-a)f_{max}$$

wherein $f(x,y)$ are pixel values before transformation, $c(x,y)$ equals zero for pixels within the region of interest and equals 1 for pixels inside the collimation shadow region and has an intermediate value in the transition zone, and 'a' represents the mapping slope within the collimation shadow region.

If 'a' equals 1 then $g(x,y)$ is equal to $f(x,y)$ everywhere in the image, in other words there is no distinction between pixels within the region of interest or within the collimation shadow zone.

If for example 'a' equals 1/3; then in the region of interest $c(x,y)$ is equal to zero and $g(x,y)$ is equal to $f(x,y)$ and outside the region of interest $c(x,y)$ equals 1 so that $g(x,y)=af(x,y)+(1-a)f_{max}$.

BRIEF DESCRIPTION OF THE DRAWINGS

Further details concerning the method of the present invention are described hereafter with reference to the drawings wherein FIG. 1 generally shows a system in which the method of the invention can be applied.

DETAILED DESCRIPTION OF THE DRAWINGS

Figure 1:
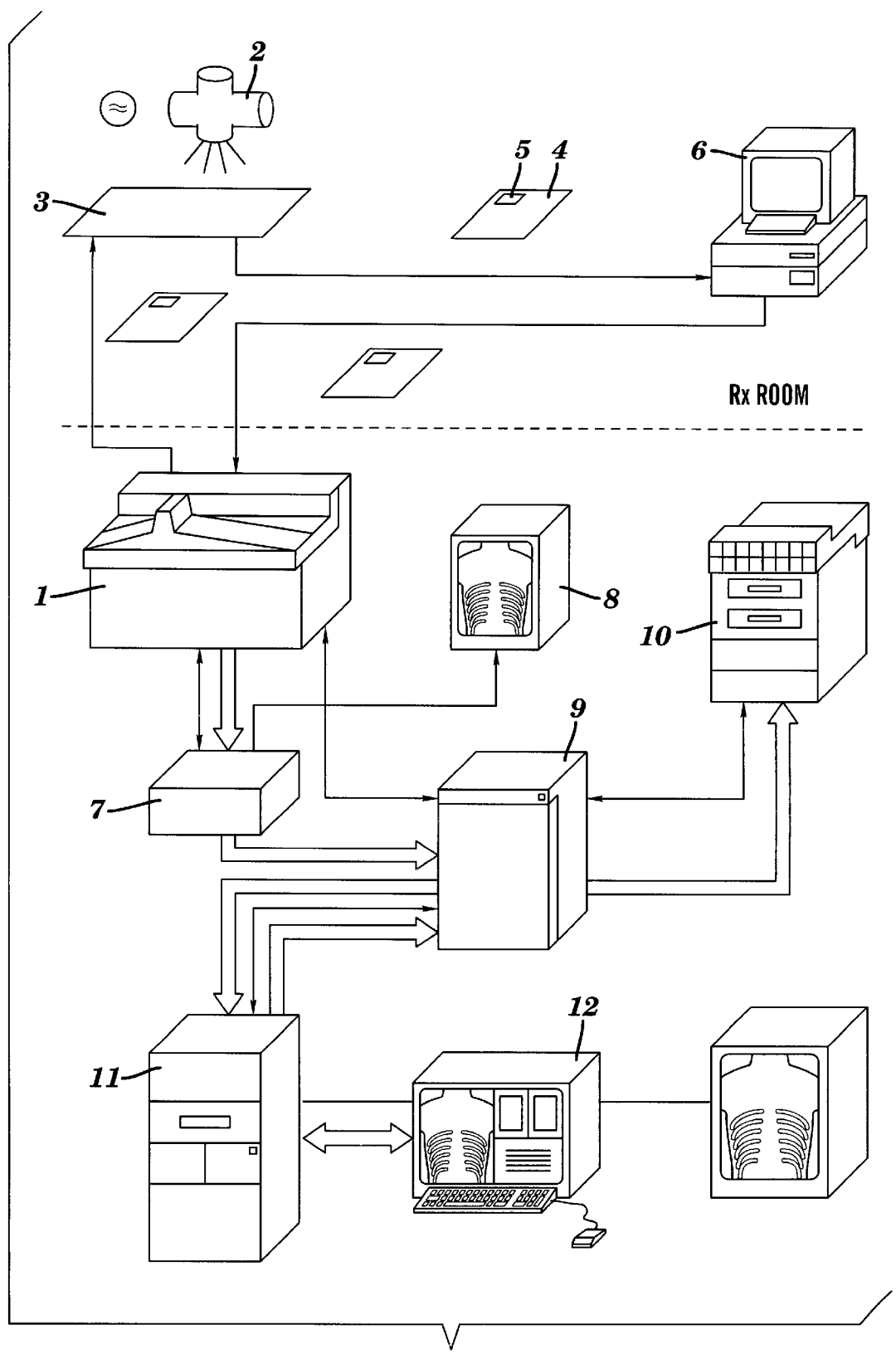

FIG. 1 generally shows an apparatus in which the method of the invention can be applied.

A radiation image of an object was recorded on a photostimulable phosphor screen (3) by exposing (2) said screen to x-rays transmitted through the object (not shown). The stimulable phosphor screen was conveyed in a cassette (4) provided with an electrically erasable programmable read only memory (EEPROM) (5). In an identification station (6) various kinds of data, for example patient identification data (name, date of birth) and data relating to the exposure and/or to the signal processing such as processing parameters were written into the EEPROM (5).

Figure 2:
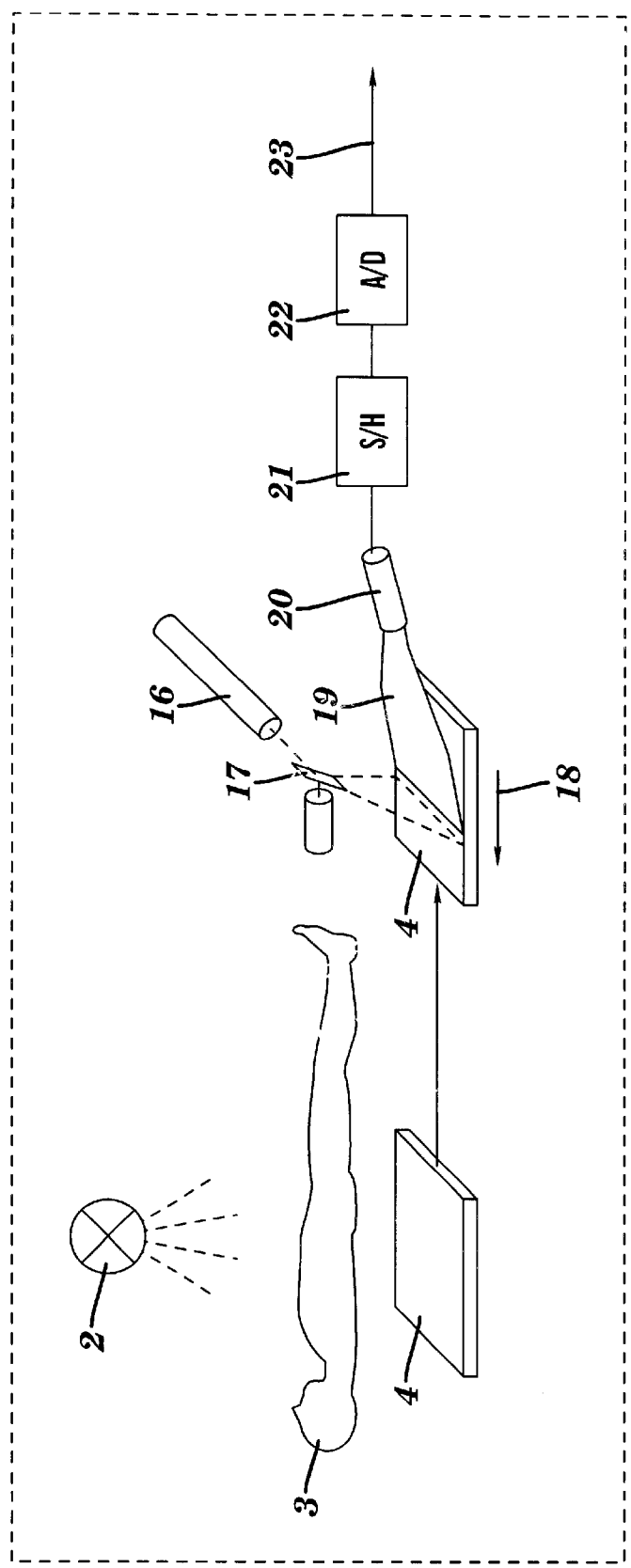
FIG. 2 is a specific embodiment of an apparatus for reading out an image stored in a photostimulable phosphor screen.

In a radiation image read-out apparatus (1) the information stored in the EEPROM and the image stored in the photostimulable phosphor screen were read-out. The read-out method is illustrated in FIG. 2. The stored image was read-out by scanning the phosphor screen with stimulating rays emitted by a laser 16. The stimulating rays were deflected into the main scanning direction by means of galvanometric deflection 17. The sub-scanning was performed by transporting the phosphor screen in the sub-scanning direction 18. The stimulated emission was directed by means of a light collector 19 onto a photomultiplier 20 for conversion into an electrical image representation. Next, the signal was sampled by a sample and hold circuit 21, converted into a logarithmic quantity log E (E representing the exposure value) and quantized by means of an analog to digital convertor 22. The digital image signal 23 was sent to the image processing module of the read-out apparatus (FIG. 1, numeral 7) where it was stored in an internal buffer.

The read-out signal was also applied to a preview monitor 8 for display immediately after read-out providing an operator with an early feed back on the performed exposure.

The read-out apparatus 1 and processing module 7 was further connected to a workstation 11 and associated review console 12 where off-line processing was performed.

The read-out apparatus and associated processor as well as the workstation and associated review console were connected via a buffer 9 to an output recorder 10.

Figure 3:
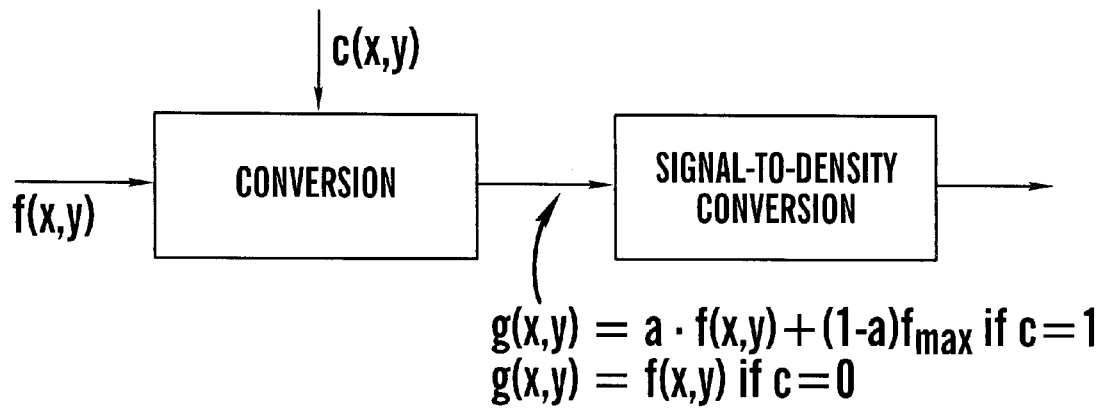
FIG. 3 illustrates different processing of pixels in dependence on their location.

In accordance with the present invention, signal values representing pixels of the image are differently processed depending on the fact whether they belong to a region that is diagnostically relevant or that is diagnostically irrelevant as is illustrated in FIG. 3.

Pixels belonging to a diagnostically relevant zone in the image are converted by an identity transformation (which is identical to not converting these pixels) whereas pixels outside the diagnostically relevant zone are converted according to a conversion function that can be represented by the following equation: $g(x,y)=a.f(x,y)+(1-a).f_{max}$, wherein $f(x,y)$ is the signal value before conversion of a pixel located at position $(x,y)$, a is a value between zero and one, and $f_{max}$ is equal to the maximum of values $f(x,y)$.

Figure 4:
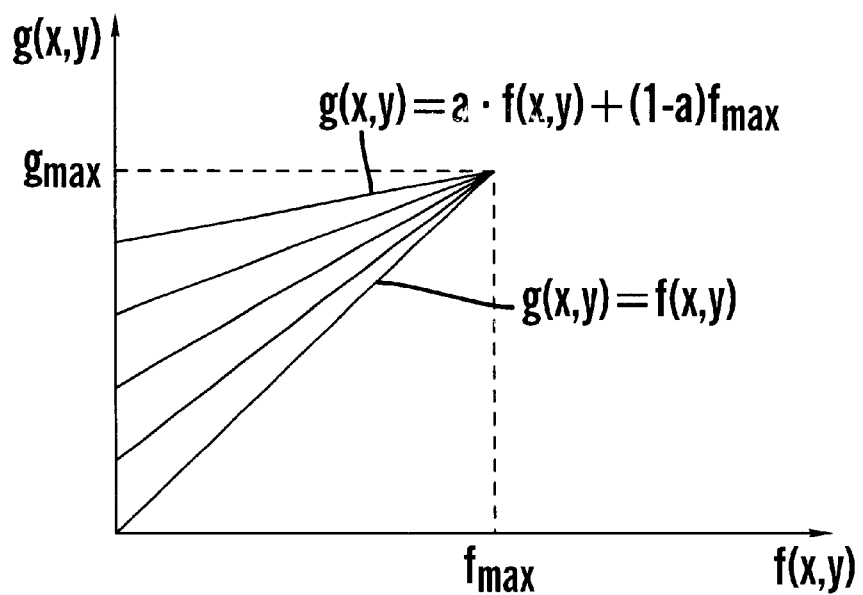
FIG. 4 shows a conversion function $g(x,y)$.

This is implemented by applying an additional look up table to pixels outside the diagnostically relevant image zone. The plot of this conversion curve is shown in FIG. 4.

However, in this embodiment image processing performed on the digital representation of the radiographic image either on-line in the processing unit of the read-out apparatus or off-line in the workstation was performed on a multi-resolution representation, more specifically a pyramidal multi-resolution representation of the image. The pyramidal multi-resolution representation was then subjected to modification, including distinct treatment of pixels within and outside a diagnostically relevant zone, and finally the modified (enhanced) multi-resolution representation was subjected to a reconstruction step.

The distinct processing of pixels within and outside a diagnostically relevant image zone was only performed on a modified and partially reconstructed image wherein only some resolution levels, more specifically the low resolution levels, are taken into account during the reconstruction process.

In the following, the image decomposition, the modification of the decomposed image representation and the reconstruction is first explained with reference to all resolution levels.

The multi-resolution representation was obtained by decomposing the original image into a sequence of detail images at multiple resolution levels and a residual image at a resolution level lower than the minimum of said multiple resolution levels. The number of pixels in each detail image decreases at each coarser resolution level.

The detail images at successively coarser resolution levels were obtained as the result of each of K iterations of the following steps:
a) computing an approximation image at a next coarser level by applying a low pass filter to the approximation image corresponding to the current iteration, and sub-sampling the result in proportion to the reduction in spatial frequency bandwidth, using however the original image as input to said low pass filter in the course of the first iteration; and
b) computing a detail image as the pixelwise difference between the approximation image corresponding to the current iteration and the approximation image at a next coarser resolution level computed according the method step sub a), both images being brought into register by proper interpolation. of the latter image. The residual image is then equal to the approximation image produced by the last iteration.

Figure 5:
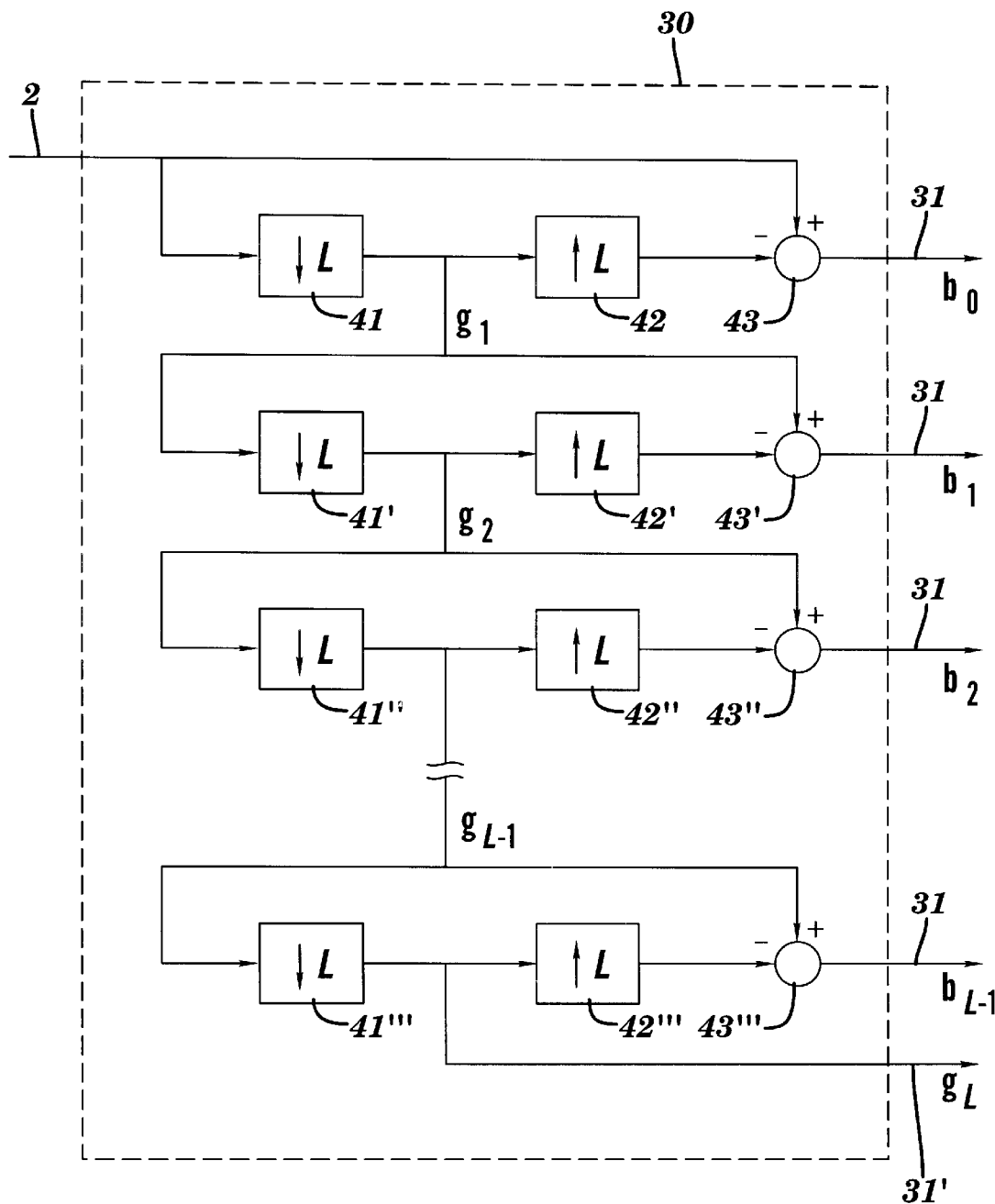
FIG. 5 illustrates the decomposition of an image into a multi-resolution resolution pyramidal representation.

FIG. 5 illustrates an embodiment of a decomposition step.

The original image is filtered by means of a low pass filter 41, and sub-sampled by a factor of two, which is implemented by computing the resulting low resolution approximation image $g_1$ only at every other pixel position of every alternate row.

A detail image $b_0$ at the finest level is obtained by interpolating the low resolution approximation $g_1$ with doubling of the number of rows and columns, and pixelwise subtracting the interpolated image from the original image.

The interpolation is effectuated by the interpolator 42, which inserts a column of zero values every other column, and a row of zero values every other row respectively, and next convolves the extended image with a low pass filter. The subtraction is done by the adder 43.

The same process is repeated on the low resolution approximation $g_1$ instead of the original image, yielding an approximation of still lower resolution $g_2$ and a detail image $b_1$.

A sequence of detail images $b_i$, i=0 ... L−1 and a residual low resolution approximation $g_L$ are obtained by iterating the above process L times.

The finest detail image $b_0$ has the same size as the original image. The next coarser detail image $b_1$ has only half as many rows and columns as the first detail image $b_0$. At each step of the iteration the maximal spatial frequency of the resulting detail image is only half that of the previous finer detail image, and also the number of columns and rows is halved, in accordance with the Nyquist criterion. After the last iteration a residual image $g_L$ 31' is left which can be considered to be a very low resolution approximation of the original image. In the extreme case it consists of only 1 pixel which represents the average value of the original image. The filter coefficients of the low pass filter of the preferred embodiment correspond approximately to the samples of a two dimensional gaussian distribution on a 5×5 grid. The same filter coefficients are used for the low pass filters 41, 41', ... 41''' at all scales. The same filter kernel with all coefficients multiplied by 4 is also used within the interpolators 42, 42', ... 42'''. The factor of 4 compensates for the insertion of zero pixel columns and rows as explained above.

The above method as well as other examples of procedures for acquiring such a multi-resolution representation have been described in European patent application EP 527 525.

Next the pixel values of said detail images were subjected to a modification step in order to yield pixel values of a set of modified detail images. The pixel values of the detail images were modified according to at least one non-linear monotonically increasing odd conversion function with a slope that gradually decreases with increasing argument values. Object of this modification is image enhancement.

Figure 6:
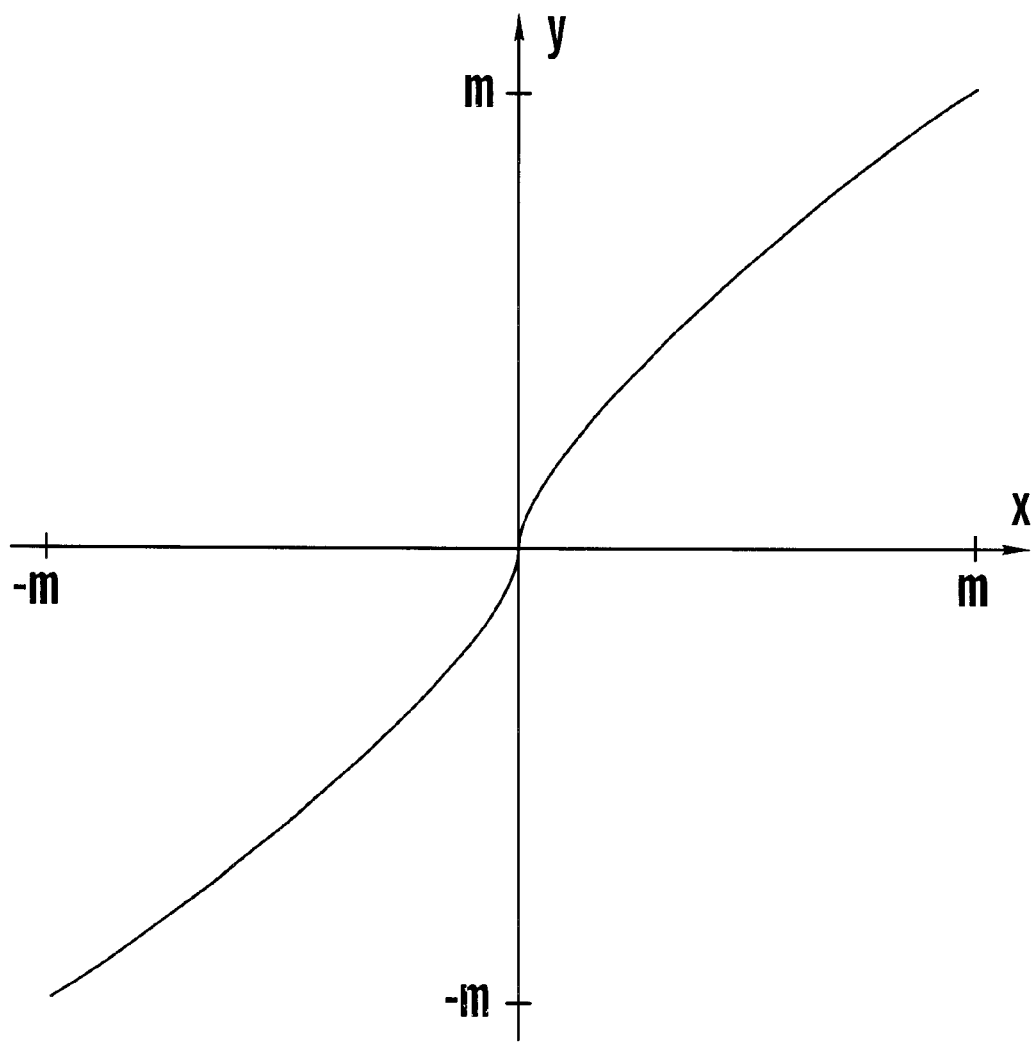
FIG. 6 illustrates the modification of a multi-resolution representation of an image.

Examples of adequate conversion functions are also disclosed in the already mentioned European patent application 527 525. An example of such a function is shown in FIG. 6.

Finally an enhanced processed image was computed by applying a reconstruction algorithm to the residual image and the modified detail images, the reconstruction algorithm being such that if it were applied to the residual image and the detail images without modification, then said original image or a close approximation thereof would be obtained.

In this particular embodiment, this reconstruction algorithm was computed by iterating K times the following procedure starting from the coarsest detail image and the residual image:

computing the approximation image at the current resolution level by pixelwise adding the detail image at the same resolution level to the approximation image at the coarser resolution level corresponding to the previous iteration, both images being brought into register by proper interpolation of the latter image, using however the residual image instead of said coarser approximation image in the course of the first iteration.

Alternative reconstruction methods are also described in the above mentioned European patent application 527 525.

Figure 7:
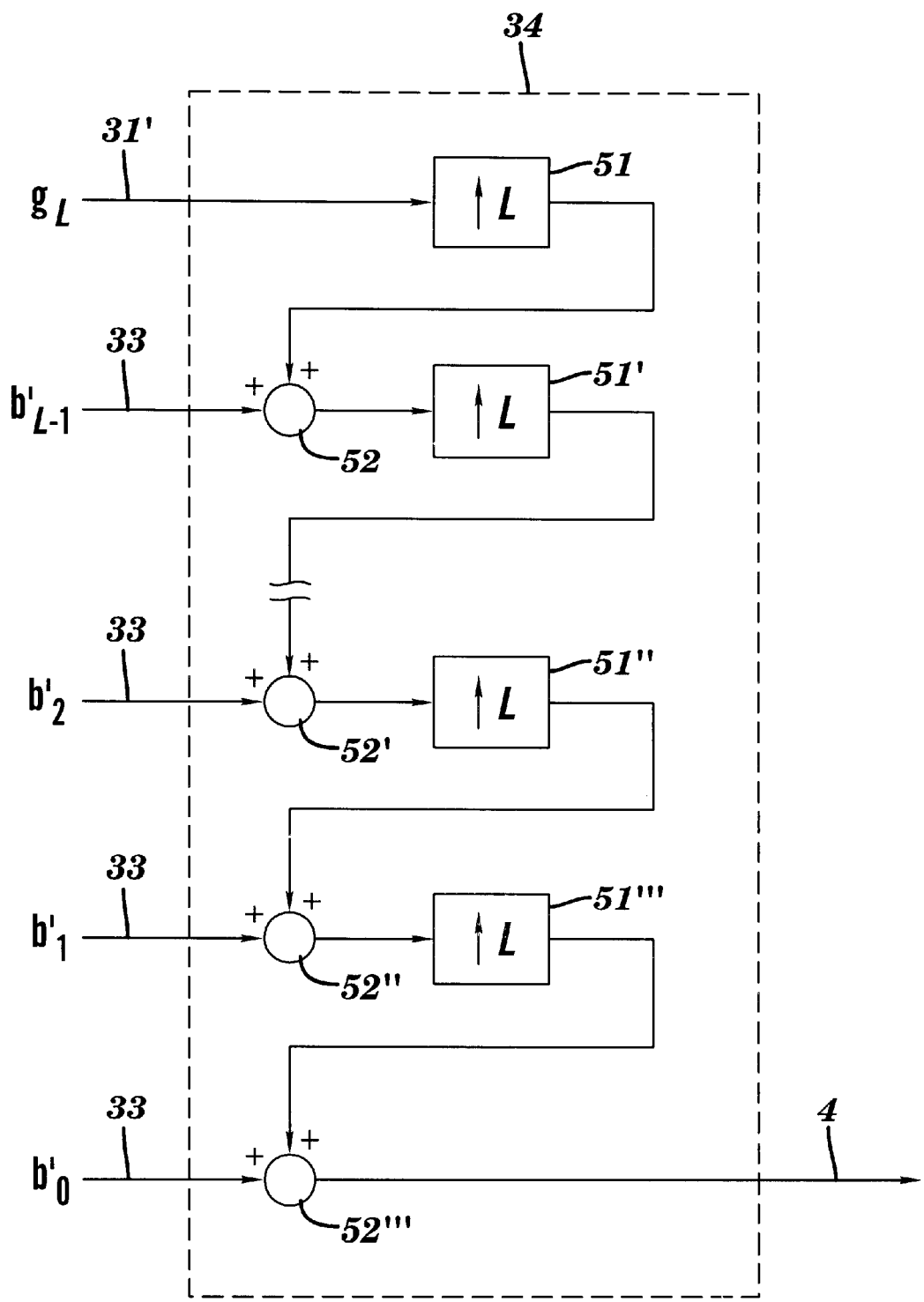
FIG. 7 illustrates the reconstruction of a modified image.

FIG. 7 is an illustration of the reconstruction process.

The residual image is first interpolated by interpolator 51 to twice its original size and the interpolated image is next pixelwise added to the detail image of the coarsest level $b'_{L-1}$, using adder 52. The resulting image is interpolated and added to the next finer detail image. If this process is iterated L times using the unmodified detail images $b_{L-1} \ldots b_0$, then an image equal to the original image will result. If at the other hand the detail images are modified before reconstruction according to the findings of the present invention, then a contrast enhanced image will result. The interpolators 51, 51' ... 51''' are identical to those used in the decomposition section.

Figure 8:
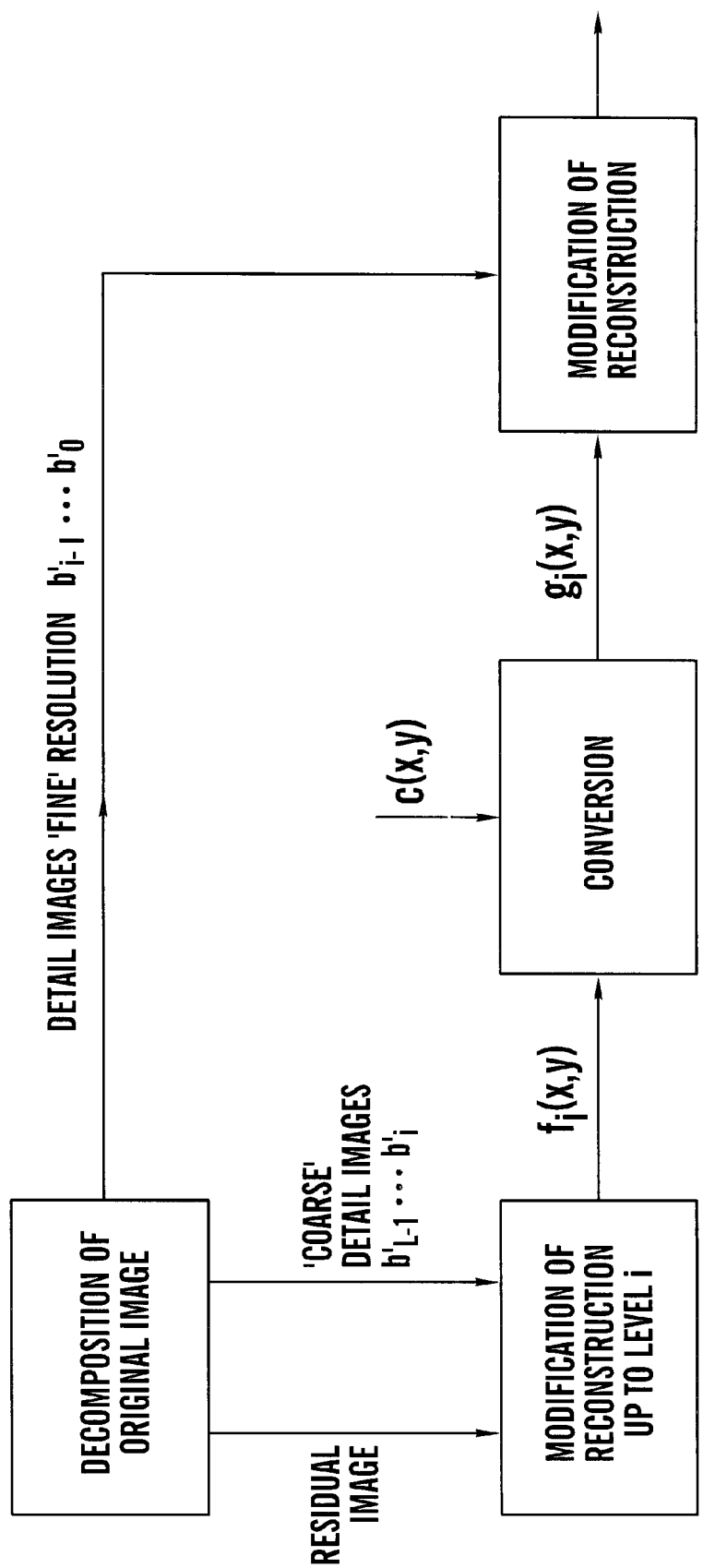
FIGS. 8 and 9 illustrate a preferred embodiment of the method of differently processing pixels in dependence on their location.

The method of the present invention as applied in this specific embodiment is shown in FIG. 8.

The additional conversion of pixels in a diagnostically irrelevant image zone was only applied to a partially reconstructed image, more specifically to an image reconstructed only by means of low resolution levels, representing coarse detail images starting from the residual image and the detail images of successive finer scale up to some intermediate level i.

The information whether a pixel was part of an irrelevant zone or not was provided in the form of an overlay image denoted as C(x,y) in FIG. 8 and indicating for a pixel at location (x,y) in the image whether or not said pixel was part of a diagnostically relevant image zone.

Figure 9:
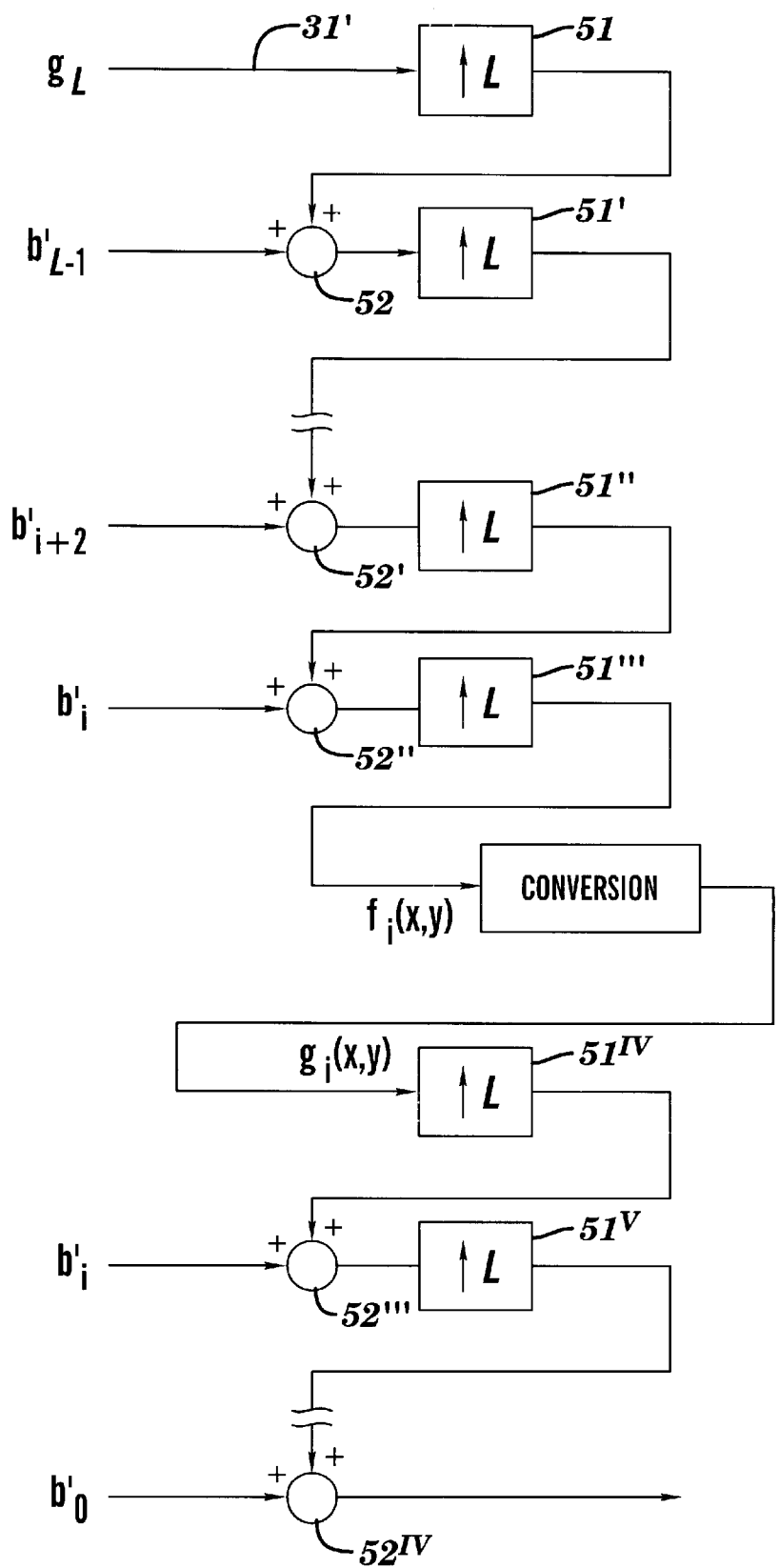

After being converted, the partially reconstructed image was subjected to the remainder of there reconstruction process as is shown in FIG. 9.

Next this reconstructed image was mapped onto density values envisioned in a hard copy on photographic film. Signal values were mapped to density values in between fog and maximum density attainable on photographic film, in casu density equal to 3.

Obviously this signal to density mapping could additionally have been preceded by gradation processing.

The specific processing performed on the pixels in the diagnostically irrelevant zone can be performed on line as well as in the workstation.

The method applied in this embodiment for automatically determining a diagnostically relevant zone has been described in extenso in the published European patent application 610 605 (published Aug. 17, 1994).

In according with the method disclosed in EP 610 605, first the location of a signal/shadow boundary in an X-ray image represented in a digital signal representation is determined by the steps of:

i) Extracting low-level primitives from the X-ray image {X(i,j)}, said low level primitives preferably being lines, ii) Forming a reduced number of intermediate-level primitives from the low-level primitives, being line clusters, iii) Building hypotheses as to the location of the signal-shadow boundary from combinations of intermediate-level. primitives, during which each combination is subjected to intermediate-level tests, iv) rejecting or accepting partial or complete hypotheses upon the result of said tests, iv) Performing high-level verification tests on each hypothesis, whereupon hypotheses are rejected, or accepted at some cost, and v) Selecting the hypothesis with the least cost.

Then a different binary value is assigned to pixels within the determined signal shadow boundary than to pixels outside said signal shadow boundary.

As a result of this method, the information as to whether or not a pixel was part of the region of interest is given in the form of an overlay image. This overlay image is a low resolution binary image comprising labels which identify a pixel as belonging to the region of interest or not. This must have the same array dimensions as $f_i(x,y)$.

This overlay image is represented by C(x,y) in FIG. 8 and controls application of g(x,y).

Blocking artifacts which were caused by the particular nature of the overlay image obtained by application of the method disclosed in European patent application 610 605, namely by the fact that the overlay image is a low resolution binary image, are avoided by transforming the binary overlay into a multiple valued overlay image through application of low pass filtering.

A gradual transition of the applied mapping transformations was provided for pixels in a transition zone, i.e. for pixels situated in the vicinity of the boundary between region of interest and irrelevant image zone.

The slope and the intersect of the applied mapping transformation was controlled by the pixel value in the overlay image, being multiple valued instead of binary.

The applied mapping transformation has a maximal slope in the collimation material shadow region and is equal to the identity mapping in the diagnostically relevant image region and has an intermediate slope value in the transition zone as is shown in FIG. 4.

This transformation can mathematically be expressed as follows:

$$g(x,y)=[1+C(x,y)(a-1)]f(x,y)+C(x,y)(1-a)f_{max}$$

wherein f(x,y) are pixel values before transformation, c(x,y) equals zero for pixels within the region of interest and equals 1 for pixels inside the collimation shadow region and has an intermediate value in the transition zone, and 'a' represents the mapping slope within the collimation shadow region.

If 'a' equals 1 then g(x,y) is equal to f(x,y) everywhere in the image, in other words there is no distinction between pixels within the region of interest or within the collimation shadow zone.

If for example 'a' equals 1/3; then in the region of interest c(x,y) is equal to zero and g(x,y) is equal to f(x,y) and outside the region of interest c(x,y) equals 1 so that $g(x,y)=af(x,y)+(1-a)f_{max}$.

By the low pass filtering referred to hereinbefore, C takes a value in a real value range between zero and 1 so that a gradual transition is obtained between both mappings.

If 'a' equals zero then g(x,y) is equal to $f_{max}$ in the collimation shadow region.

What is claimed is:

1. A method of processing an image in a radiographic imaging system wherein an electric signal representation of said image is mapped to density values for visualization as a hard or a soft copy image characterized in that the density of low density area in a diagnostically irrelevant zone in the image is enhanced and image structure in said zone is kept visible, by converting in said diagnostically irrelevant zone of the image pixels located at position (x,y) according to a conversion function $g(x,y)=a.f(x,y)+(1-a).f_{max}$ wherein f(x, y) is the signal value before conversion of a pixel located at position (x,y), a is a value between zero and one, and $f_{max}$ is equal to the maximum of values f(x,y), prior to being subjected to mapping into density values.

2. A method according to claim 1 wherein a diagnostically irrelevant zone is defined as encompassing all image points within the image that are not comprised within a diagnostically relevant image zone, defined under visual control on a monitor.

3. A method of processing according to claim 2 wherein the diagnostically relevant image zone within the image is determined by a method comprising the following steps:
   a) visualizing the image on the screen of a monitor;
   b) generating a moveable light mark on the screen of said monitor;
   c) synchronizing the motion of said light mark with the motion of a marking means of a coordinate identification device; and
   d) defining the diagnostically relevant image zone as comprising all image points the coordinates whereof are comprised within a contour drawn by moving said light mark under visual control on the screen of the monitor.

4. A method of processing according to claim 2 wherein the diagnostically relevant image zone within the image is determined by a method comprising the following steps:
   a) visualizing the image on the screen of the monitor;
   b) generating a moveable light mark on the screen of said monitor;
   c) synchronizing the motion of said light mark with the motion of a marking means of a coordinate identification device;
   d) marking an image point as the upper left corner point of the diagnostically relevant image zone;
   e) marking another image point as the lower right corner point of the diagnostically relevant image zone;
   f) determining the coordinates of both said image points and determining a rectangle on the basis of said coordinates; and
   g) defining the diagnostically relevant image zone as comprising all image points the coordinates whereof are comprised within said rectangle.

5. A method of processing according to claim 2 wherein the diagnostically relevant image zone within the image is determined by a method comprising the following steps:
   a) visualizing the image on the screen of the monitor;
   b) generating a moveable light mark on the screen of said monitor;
   c) synchronizing the motion of said light mark with the motion of a marking means of a coordinate identification device;
   d) marking an image point as the center point of the diagnostically relevant image zone;
   e) marking another image point as the outer point of the diagnostically relevant image zone;
   f) determine the coordinates of both said image points; and
   g) defining the diagnostically relevant zone part as comprising all image points the coordinates whereof are comprised within a circle, the center point whereof coincides with the image point marked as the center point of the diagnostically relevant image zone, and the radius whereof is defined by the vector distance between said center point and the other image point marked as the outer point of the diagnostically relevant image zone.

6. A method of processing according to claim 2 wherein the diagnostically relevant image zone within the image is determined by a method comprising the following steps:
   a) visualizing the image on the screen of the monitor;
   b) generating a moveable light mark on the screen of said monitor;
   c) synchronizing the motion of said light mark with the motion of a marking means of a coordinate identification device;
   d) marking image points as the corner points of the diagnostically relevant image zone;
   e) determining the coordinates of said image points; and,
   f) defining the diagnostically relevant image zone as comprising all image points the coordinates whereof are comprised within a polygon, the cornerpoints whereof coincide with the image points marked as corners points of the diagnostically relevant image zone.

7. A method according to claim 1 wherein said diagnostically irrelevant zone is identified by means of an overlay image labelling each pixel of the image as belonging to said irrelevant zone or not.

8. A method according to claim 7 wherein said overlay image is obtained as a result of the following steps applied to said image:
   (1) determining the location of a signal/shadow boundary by performing the steps of:
      i) Extracting low-level primitives from the X-ray image {X(i,j)},
      ii) Forming a reduced number of intermediate-level primitives from the low-level primitives,
      iii) Building hypotheses as to the location of the signal-shadow boundary from combinations of intermediate-level primitives, during which each combination is subject to intermediate-level tests, whereupon partial or complete hypotheses are rejected or accepted,
      iv) Performing high-level verification tests on each hypothesis, whereupon hypotheses are rejected, or accepted at some cost, and,
      v) Selecting the hypothesis with the least cost.
   (2) allocating to pixels within the determined signal shadow boundary a different binary value than to pixels outside said signal shadow boundary.

9. A method of processing according to claim 1 wherein the image is recorded by a film recorder as a hard copy on a photographic recording material.

10. A method of processing according to claim 9 wherein the film recorder is a laser recorder.

11. A method of processing according to claim 1 wherein electrical signal values of pixels situated outside the image are converted to the maximum of density values that can be obtained on a recording material.

12. A method of processing according to claim 1 wherein the electrical signal representations of pixels located within a diagnostically relevant image zone are converted to density values comprised between a minimum density fog density of a photographic recording material and a maximum density in the range of 1.5 and 3.0.

13. A method according to claim 1 wherein the electrical signal representation of pixels within an image area reserved for recording patient identification data are converted to density values comprised between 0.5 and 1.5.

14. A method of processing according to claim 1 wherein the radiographic imaging system is a system in which a stimulable phosphor wherein a radiation image has been stored is scanned with stimulating rays, and wherein light emitted upon stimulation is detected and converted into an electric signal representation of the image.

15. A method of processing an image in a radiographic imaging system wherein an electrical signal representation of said image is mapped to density values for visualization as a hard or a soft copy image characterized in that a) said image is decomposed into a sequence of detail images at multiple resolution levels and a residual image at a resolution level lower than the minimum of said multiple resolution levels, b) pixel values of the detail images are modified to yield pixel values of a set of modified detail images by converting the former pixel values according to at least one non-linear monotonically increasing odd conversion function with a gradually decreasing slope, c) a partially reconstructed image is produced by applying to the residual image and to modified detail images up to a predetermined resolution level a reconstruction algorithm that would render said image or a close approximation thereof if it were applied to the residual image and all of the detail images without modification, d) said partially reconstructed image is modified by converting signal values of said partially reconstructed image corresponding with pixels located at position (x,y) in a diagnostically irrelevant zone of the image according to a conversion function $g(x,y)=a.f(x,y)+(1-a).f_{max}$ wherein $f(x,y)$ is the signal value before conversion of a pixel located at position (x,y) in said partially reconstructed image, a is a value between zero and one, and $f_{max}$ is equal to the maximum of values $f(x,y)$, and, e) a final reconstructed image is produced by applying said reconstruction algorithm to the result of step (d) and the detail images of resolution higher than said predetermined resolution level.

16. A method of processing an image in a radiographic imaging system wherein an electric signal representation of said image is mapped to density values for visualization as a hard or a soft copy image characterized in that a) said image is decomposed into a sequence of detail images at multiple resolution levels and a residual image at a resolution level lower than the minimum of said multiple resolution levels, b) pixel values of the detail image are modified to yield pixel values of a set of modified detail images by converting the former pixel values according to at least one non-linear monotonically increasing odd conversion function with a gradually decreasing slope, c) a partially reconstructed image is produced by applying a reconstruction algorithm to the residual image and the modified detail images up to a predetermined resolution level a reconstruction algorithm that would render said image or a close approximation thereof if it were applied to the residual image and all of the detail images without modification, d) said partially reconstructed image is modified by converting signal values of said partially reconstructed image corresponding with pixels located at position (x,y) in a diagnostically irrelevant zone of the image according to a conversion function $g(x,y)=[1+C(x,y).(a-1)].f(x,y)+C(x,y).(1-a).f_{max}$, wherein $f(x,y)$ is the signal value before conversion of a pixel located at position (x,y) in said partially reconstructed image, a is a value between zero and one, and $f_{max}$ is equal to the maximum of values $f(x,y)$, $C(x,y)$ is equal to 1 in a diagnostically irrelevant zone and $0<C(x,y)<1$ for pixel in a transition zone between diagnostically relevant and diagnostically irrelevant image zone, and, e) a final reconstructed image is produced by applying said reconstruction algorithm to the result of step (d) and the detail images of resolution higher than said predetermined resolution level.

* * * * *